United States Patent
Lee (10) Patent No.: US 12,307,052 B2
(45) Date of Patent: May 20, 2025

(54) PROJECTION SYSTEM, INTERACTIVE PROJECTION METHOD AND PROJECTOR

(71) Applicant: Optoma Corporation, New Taipei (TW)

(72) Inventor: Jiun-De Lee, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 18/502,083

(22) Filed: Nov. 6, 2023

(65) Prior Publication Data

US 2024/0231543 A1  Jul. 11, 2024

(30) Foreign Application Priority Data

Jan. 11, 2023 (CN) .......................... 202310041622.8

(51) Int. Cl.
*G06F 3/042* (2006.01)
*G06F 3/0354* (2013.01)
(Continued)

(52) U.S. Cl.
CPC ........ *G06F 3/0425* (2013.01); *G06F 3/03542* (2013.01); *G06F 3/03545* (2013.01);
(Continued)

(58) Field of Classification Search
CPC .. G06F 3/0425; G06F 3/0354; G06F 3/03545; G06F 3/0383; G06F 3/0482;
(Continued)

(56) References Cited

U.S. PATENT DOCUMENTS 5,818,421 A * 10/1998 Ogino ................. G06F 3/04162
345/157
2011/0102599 A1  5/2011 Kwon et al.
(Continued)

FOREIGN PATENT DOCUMENTS

CN  201494176  6/2010
CN  103888700  6/2014
(Continued)

OTHER PUBLICATIONS

"Search Report of Europe Counterpart Application", issued on Apr. 10, 2024, p. 1-p. 13.
(Continued)

*Primary Examiner* — Afroza Chowdhury
(74) *Attorney, Agent, or Firm* — JCIPRNET (57) ABSTRACT

A projection system, an interactive projection method and a projector are provided. The projection system includes an operation pen and a projector. The projector is wirelessly connected to the operation pen. The projector includes at least one processing unit, a projection unit, and a photographing unit. The projection unit is electrically coupled to the at least one processing unit and configured to project an interactive image onto a projection target. The photographing unit is electrically coupled to the at least one processing unit and configured to photograph the projection target to obtain an image. The at least one processing unit captures a writing image in the image. The writing image is formed by a selection trajectory of a selection operation of the operating pen on the projection target.

23 Claims, 6 Drawing Sheets

(51) Int. Cl.
*G06F 3/038* (2013.01)
*G06F 3/0482* (2013.01)
*G06F 3/04845* (2022.01)
*G06T 7/11* (2017.01)
*G06T 7/194* (2017.01)

(52) U.S. Cl.
CPC .......... *G06F 3/0383* (2013.01); *G06F 3/0482* (2013.01); *G06F 3/04845* (2013.01); *G06T 7/11* (2017.01); *G06T 7/194* (2017.01); *G06F 2203/0384* (2013.01); *G06F 2203/04807* (2013.01)

(58) Field of Classification Search
CPC ......... G06F 3/04845; G06F 2203/0384; G06F 2203/04807; G06T 7/194; G06T 7/11
See application file for complete search history.

(56) References Cited

U.S. PATENT DOCUMENTS

| | | |
|---|---|---|
| 2013/0093666 A1 | 4/2013 | Nagai |
| 2020/0288057 A1 | 9/2020 | Yamauchi |
| 2020/0310590 A1 | 10/2020 | Otani et al. |
| 2020/0371611 A1 | 11/2020 | Karasawa |
| 2022/0239877 A1 | 7/2022 | Fujimori |
| 2022/0276749 A1* | 9/2022 | Fujimori ............... G06F 3/0481 |
| 2022/0311980 A1* | 9/2022 | Kumagai ............. H04N 9/3179 |
| 2023/0022214 A1* | 1/2023 | Fujimori ............... G06F 1/1645 |

FOREIGN PATENT DOCUMENTS

| | | |
|---|---|---|
| CN | 107430389 | 12/2017 |
| CN | 107430839 | 12/2017 |
| CN | 107957824 | 4/2018 |
| CN | 107979748 | 5/2018 |
| CN | 110853418 | 2/2020 |
| CN | 112269479 | 1/2021 |
| CN | 114374827 | 4/2022 |
| JP | 2005354171 | 12/2005 |
| JP | 2006018374 | 1/2006 |
| JP | 2017024256 | 2/2017 |
| JP | 2017182246 | 10/2017 |
| JP | 2019120884 | 7/2019 |
| JP | 2020134922 | 8/2020 |
| TW | 201135341 | 10/2011 |
| TW | 201403398 | 1/2014 |
| TW | I454968 | 10/2014 |
| TW | 201523349 | 6/2015 |

OTHER PUBLICATIONS

"Office Action of Taiwan Counterpart Application", issued on Mar. 19, 2025, p. 1-p. 15.

* cited by examiner

PROJECTION SYSTEM, INTERACTIVE PROJECTION METHOD AND PROJECTOR

CROSS-REFERENCE TO RELATED APPLICATION

This application claims the priority benefit of China application serial no. 202310041622.8, filed on Jan. 11, 2023. The entirety of the above-mentioned patent application is hereby incorporated by reference herein and made a part of this specification.

BACKGROUND

Technical Field

The disclosure relates to an interactive display technology, and particularly relates to a projection system, an interactive projection method adapted to the projection system, and a projector applied to the projection system.

Description of Related Art

Conventional projector may be used in teaching to project images onto a blackboard or a whiteboard so that a teacher may share and explain the images, thereby achieving an effect of teaching assistance. However, since the conventional projector may only simply provide projection images, there is a lack of a real-time interactive function.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection system, an interactive projection method and a projector, which are adapted to achieve real-time interactive projection.

Additional aspects and advantages of the disclosure will be set forth in the description of the techniques disclosed in the disclosure.

In order to achieve one or a portion of or all of the objects or other objects, the disclosure provides a projection system including an operation pen and a projector. The projector is wirelessly connected to the operation pen. The projector includes at least one processing unit, a projection unit and a photographing unit. The projection unit is electrically coupled to the processing unit and used for projecting an interactive image onto a projection target. The photographing unit is electrically coupled to the at least one processing unit and used for photographing the projection target to obtain an image. The at least one processing unit is configured to receive the image provided by the photographing unit and capture a writing image in the image. The writing image is formed by a selection trajectory of a selection operation of the operation pen on the projection target.

In an embodiment of the disclosure, the at least one processing unit is configured to control the projection unit to project the interactive image with the writing image onto the projection target.

In an embodiment of the disclosure, the at least one processing unit is configured to perform a background removal process on the writing image.

In an embodiment of the disclosure, the interactive image includes a function menu pattern, and the operation pen touches the function menu pattern on the projection target through a piezoelectric element of the operation pen to perform function selection.

In an embodiment of the disclosure, in response to the operation pen touching the function menu pattern to select an editing function or a moving function, the at least one processing unit is configured to edit or move the writing image according to an editing operation or a moving operation of the operation pen on the projection target.

In an embodiment of the disclosure, the projector of the projection system is configured to project a duplicated image, the duplicated image has same image content as the writing image, and coordinates of the duplicated image do not overlap with coordinates of the writing image on the projection target.

In an embodiment of the disclosure, the operation pen includes a piezoelectric element and a wireless communication module. The piezoelectric element is disposed on a pen point of the operation pen. The wireless communication module is electrically coupled to the piezoelectric element and outputs a wireless signal to the at least one processing unit in response to the piezoelectric element touching the projection target, so that the at least one processing unit is configured to determine a moving trajectory of a hand object using the operation pen as the selection trajectory.

In an embodiment of the disclosure, the operation pen includes a piezoelectric element and a light emitting unit. The piezoelectric element is disposed on a pen point of the operation pen. The light emitting unit is electrically coupled to the piezoelectric element and generates a light beam in response to the piezoelectric element touching the projection target, so that the at least one processing unit is configured to track the light beam to determine the selection trajectory of the operation pen on the projection target.

In an embodiment of the disclosure, a projection range of the projection unit is smaller than a photographing range of the photographing unit.

In an embodiment of the disclosure, the at least one processing unit is configured to obtain an actual value as a correction parameter for image measurement according to capturing a physical reference image beside the projection target through the photographing unit. The at least one processing unit is configured to correct the interactive image according to the correction parameter.

In an embodiment of the disclosure, the at least one processing unit is configured to determine a character region in the projection range, and segment the interactive image according to the character region, so that the segmented interactive image and the character region do not overlap on the projection target.

In order to achieve one or a portion of or all of the objects or other objects, the disclosure provides an interactive projection method includes: projecting an interactive image onto a projection target through a projection unit; photographing the projection target through a photographing unit to obtain an image; and receiving the image provided by the photographing unit through at least one processing unit, and capturing a writing image in the image through the at least one processing unit. The writing image is formed by a selection trajectory of a selection operation of an operation pen on the projection target.

In an embodiment of the disclosure, the interactive projection method further includes projecting the interactive image with the writing image onto the projection target through the projection unit.

In an embodiment of the disclosure, the at least one processing unit is configured to perform a background removal process on the writing image before projecting the writing image.

In an embodiment of the disclosure, the interactive image includes a function menu pattern, and the interactive projection method further includes: touching the function menu pattern on the projection target through a piezoelectric element of the operation pen to perform function selection.

In an embodiment of the disclosure, the step of performing function selection includes: in response to the operation pen touching the function menu pattern to select an editing function or a moving function, editing or moving the writing image by the at least one processing unit according to an editing operation or a moving operation of the operation pen on the projection target.

In an embodiment of the disclosure, the interactive projection method further includes projecting a duplicated image. The duplicated image has same image content as the writing image, and coordinates of the duplicated image do not overlap with coordinates of the writing image on the projection target.

In an embodiment of the disclosure, the interactive projection method further includes outputting a wireless signal to the at least one processing unit through a wireless communication module in response to the operation pen touching the projection target through a piezoelectric element of the operation pen; and determining a moving trajectory of a hand object using the operation pen as the selection trajectory by the at least one processing unit.

In an embodiment of the disclosure, the interactive projection method further includes generating a light beam through a light emitting unit of the operation pen in response to the operation pen touching the projection target through a piezoelectric element; and using the photographing unit to track the light beam by the at least one processing unit to determine the selection trajectory of the operation pen on the projection target.

In an embodiment of the disclosure, a projection range of the projection unit is smaller than a photographing range of the photographing unit.

In an embodiment of the disclosure, the interactive projection method further includes using the photographing unit to capture a physical reference image beside the projection target by the at least one processing unit to obtain an actual value as a correction parameter for image measurement; and correcting the interactive image by the at least one processing unit according to the correction parameter.

In an embodiment of the disclosure, the step of projecting the interactive image includes using the photographing unit to determine a character region in a projection range by the at least one processing unit; segmenting the interactive image by the at least one processing unit according to the character region; and projecting the segmented interactive image onto the projection target. The segmented interactive image and the character region do not overlap on the projection target.

In order to achieve one or a portion of or all of the objects or other objects, the disclosure provides a projector including at least one processing unit, a projection unit and a photographing unit. The projection unit is electrically coupled to the at least one processing unit and used for projecting an interactive image onto a projection target. The photographing unit is electrically coupled to the at least one processing unit and used for photographing the projection target to obtain an image. The at least one processing unit is used for receiving the image provided by the photographing unit, and capturing a writing image in the image. The writing image is formed by a selection trajectory of a selection operation of an operation pen on the projection target.

Based on the above descriptions, the projection system, the interactive projection method and the projector of the disclosure are adapted to project an interactive image on the projection target, and may be used in collaboration with the operation pen to capture the writing image displayed on the projection target to achieve real-time interactive projection.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
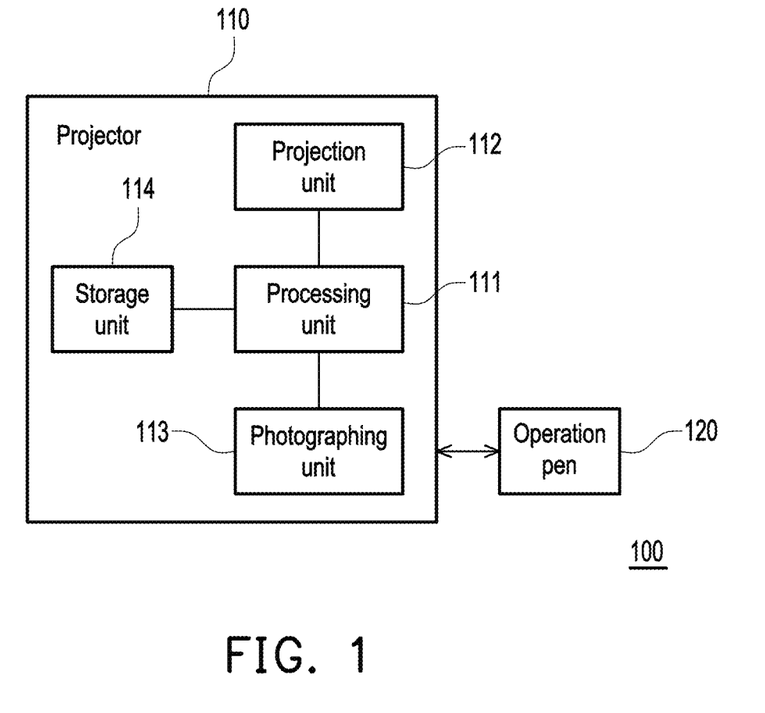
FIG. 1 is a schematic diagram of a projection system according to an embodiment of the disclosure.

FIG. 1 is a schematic diagram of a projection system according to an embodiment of the disclosure. Referring to FIG. 1, a projection system 100 includes a projector 110 and an operation pen 120. In the embodiment, the projector 110 includes a processing unit 111, a projection unit 112, a photographing unit 113 and a storage unit 114. The processing unit 111 is electrically coupled (connected for signal transmission) to the projection unit 112, the photographing unit 113 and the storage unit 114. In an embodiment, the photographing unit 113 may also be a single device independent to the projector 110 and connected to the processing unit 111 in a wired or wireless manner. In the embodiment, the projection unit 112 may be used to project an interactive image onto a projection target, and the photographing unit 113 may be used to photograph the projection target to obtain an image. The processing unit 111 receives the image provided by the photographing unit 113. In the embodiment, in response to the user using the operation pen 120 to operate on the projection target, the processing unit 111 may determine an operation trajectory of the operation pen 120 on the projection target according to the image obtained by the photographing unit 113 to execute a corresponding interactive function.

In the embodiment, the projector 110 may have one processing unit 111 or a plurality of processing units 111. The processing unit 111 may include a central processing unit (CPU) with image data processing and computation functions, or other programmable general-purpose or special-purpose microprocessor, a digital signal processor (DSP), an image processing unit (IPU), a graphics processing unit (GPU), a programmable controller, an application specific integrated circuit (ASIC), a programmable logic device (PLD), other similar processing devices or a combination of these devices.

In the embodiment, the projection unit 112 may further include a light source module (such as a light emitting device with a discharge bulb, a light emitting diode, or a laser light source), an optical engine (with a light modulator, such as a reflective or transmissive spatial light modulator, taking the reflective spatial light modulator as an example, it may be reflective liquid crystal on silicon (LCOS) or a digital micro-mirror device (DMD), etc.; and the transmissive spatial light modulator is, for example, a transparent liquid crystal panel). Moreover, depending on different ways of inputting control signals, the light modulator is, for example, an optically addressed spatial light modulator (OASLM) or an electrically addressed spatial light modulator (EASLM), a projection lens group (including multiple lenses) and an image output unit (such as an I/O port or interface of output signals, which transmit image video signals or control signals through Bluetooth, Wi-Fi, Zigbee or other wireless means, and may also adopt optical fiber or other wired transmission interface, etc., for transmission.

In the embodiment, the photographing unit 113 may be a camera. The photographing unit 113 may be set in the same projector device as the projection unit 112, or may be set independently from the projection unit 112, which is not limited in the disclosure.

In the embodiment, the projector 110 may have one storage unit 114 or a plurality of storage units 114. The storage unit 114 may be, for example, a dynamic random access memory (DRAM), a flash memory or a non-volatile random access memory (NVRAM), etc. The storage unit 114 may for example, store images, pictures, related image processing programs, and related device control programs described in various embodiments of the disclosure, which may be read and executed by the processing unit 111. In the embodiment, the processing device 110 may be used to execute related image processing programs and related device control programs to implement the interactive projection function, image processing function, photographing function, etc., described in various embodiments of the disclosure.

Figure 2:
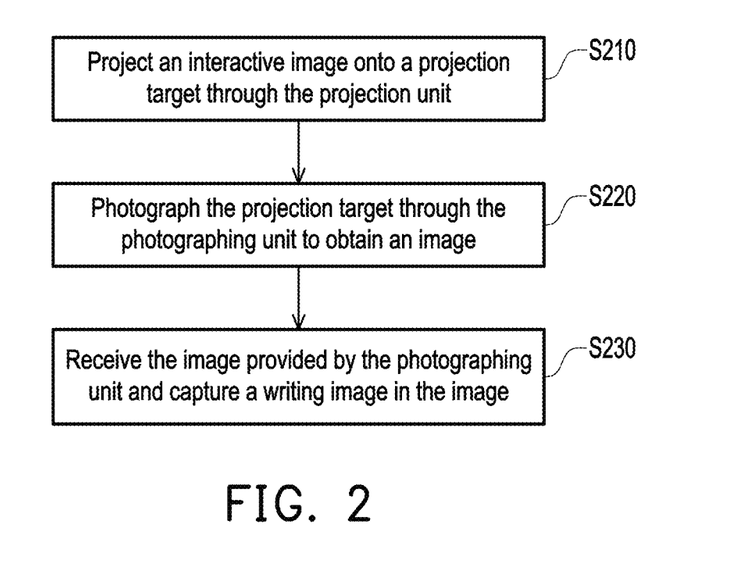
FIG. 2 is a flowchart of an interactive projection method according to an embodiment of the disclosure.
Figure 3:
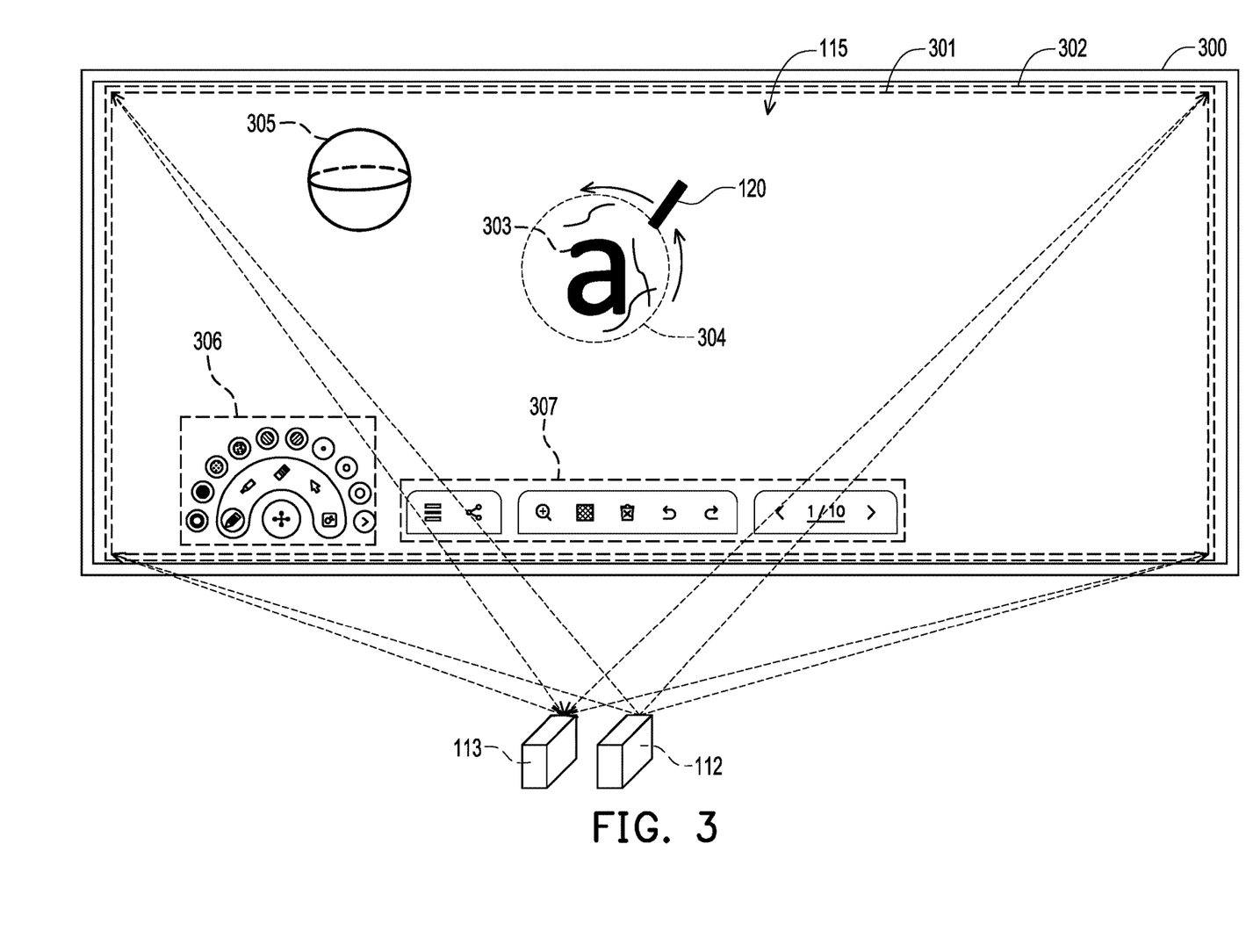
FIG. 3 is a schematic diagram of an interactive projection situation according to an embodiment of the disclosure.
Figure 4A:
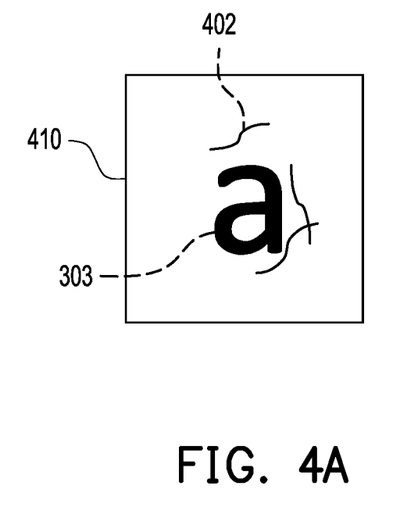
FIG. 4A is a schematic diagram of a writing image according to an embodiment of the disclosure.
Figure 4B:
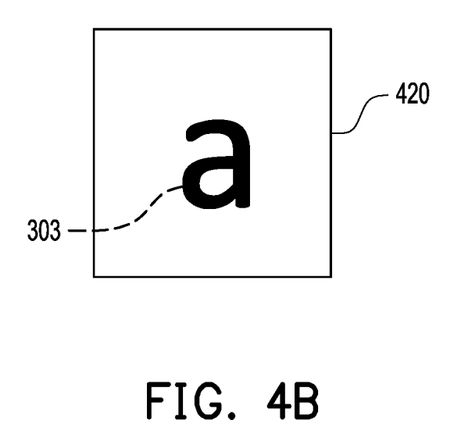
FIG. 4B is a schematic diagram of a writing image after a background removal process according to an embodiment of the disclosure.

FIG. 2 is a flowchart of an interactive projection method according to an embodiment of the disclosure. FIG. 3 is a schematic diagram of an interactive projection situation according to an embodiment of the disclosure. FIG. 4A is a schematic diagram of a writing image according to an embodiment of the disclosure. FIG. 4B is a schematic diagram of a writing image after a background removal process according to an embodiment of the disclosure. Referring to FIG. 1 to FIG. 4B, the projection system 100 may perform following steps S210-S230 to implement the interactive projection function. In step S210, the projector 110 of the projection system 100 may project an interactive image 115 onto a projection target 300 through the projection unit 112. In the embodiment, the projection target 300 may be, for example, a blackboard, a whiteboard, a wall, or a writable projection screen, etc., which is not limited by the disclosure. The projection unit 112 may project toward the projection target 300 according to a projection range 301, and the interactive image 115 may include, for example, a projection image 305 and function menu patterns 306, 307. The projection image 305 may be, for example, image data pre-stored in the storage unit 114. The function menu pattern 306 may for example, include various pattern editing functions or pattern moving functions, but the disclosure is not limited thereto. The function menu pattern 307 may include, for example, a page turning function, a pattern deleting function, a pattern zooming function, a webpage linking function, etc., which is not limited by the disclosure.

In step S220, the projection system 100 may photograph the projection target 300 through the photographing unit 113 to obtain an image. In the embodiment, the photographing unit 113 may photograph (continuously photograph) the projection target 300 according to a photographing range 302 to obtain corresponding image data. In the embodiment, the projection range 301 of the projection unit 112 may be smaller than the photographing range 302 of the photographing unit 113, but the disclosure is not limited thereto. In an embodiment, the projection range 301 may be greater than or equal to the photographing range 302.

In step S230, the projection system 100 may receive the image provided by the photographing unit 113 by the processing unit 111, and the processing unit 111 captures a writing image in the image. In the embodiment, the writing image in the image captured by the processing unit 111 is formed by a selection trajectory 304 of a selection operation of the operation pen 120 on the projection target 300. In the embodiment, the user may first write on the projection target 300 with a chalk or other colored pens, so as to generate writing content 303 (i.e., a chalk trace) on the projection target 300. Then, the processing unit 111 may select image content (including the writing content 303) of a corresponding range according to the selection trajectory 304 of the operation pen 120 on the projection target 300 to generate a writing image 410 as shown in FIG. 4A.

In the embodiment, the writing image 410 may include the writing content 303 and a background image 402, where the background image 402 may include, for example, dirt, image noise, or related non-writing content etc., on the projection target 300, the processing unit 111 may perform the background removal process on the writing image 410 to generate a background-removed writing image 420, where the background-removed writing image 420 may only include the writing content 303. In the embodiment, the processing unit 111 may also project the interactive image 115 with the writing image 420 onto the projection target 300 through the projection unit 112.

In the embodiment, a user may use the projection system 100 to capture the written content on the projection unit 112 and convert it into corresponding image data, so that the projection system 100 may re-project the image data onto the projection target 300. Moreover, in response to the operation pen 120 touching the function menu pattern 306, 307 to select an editing function or a moving function, the processing unit 111 may further edit or move the background-removed writing image 420 and/or the projection image 305 according to an editing operation or a moving operation of the operation pen 120 on the projection target 300. In other words, the user may also use the operating pen 120 to click the function menu patterns 306 and 307 on the interactive image 115 to perform an editing, moving or zoom operation on the background-removed writing image 420 and/or the projection image 305 to implement the interactive projection function. Even, in an embodiment, the projection system 100 may also, for example, capture the edited writing image 420 and/or the projection image 305 again, and convert it into other corresponding image data, so that the projection system 100 may re-project the other image data onto the projection target 300 again. Moreover, in another embodiment, in response to the user selecting a duplication option in the function menu patterns 306, 307, the projection system 100 may project a duplicated image with the same image content as the writing image 420 and/or the projection image 305 circled by the operation pen 120, a position (coordinates) of the duplicated image does not overlap with that of the writing image 420 and/or the projection image 305 on the projection target 300. In other words, the projection system 100 projects the duplicated image having the same image content as the writing image 420 and/or the projection image 305, and the coordinates of the duplicated image on the projection target 300 do not overlap with the coordinates of the writing image 420 and/or the projection image 305. Namely, the duplicated image may be displayed at a predetermined position in the interactive image 115, and the predetermined position has a distance greater than zero from the position of the writing image 420 and/or the projection image 305.

Figure 5:
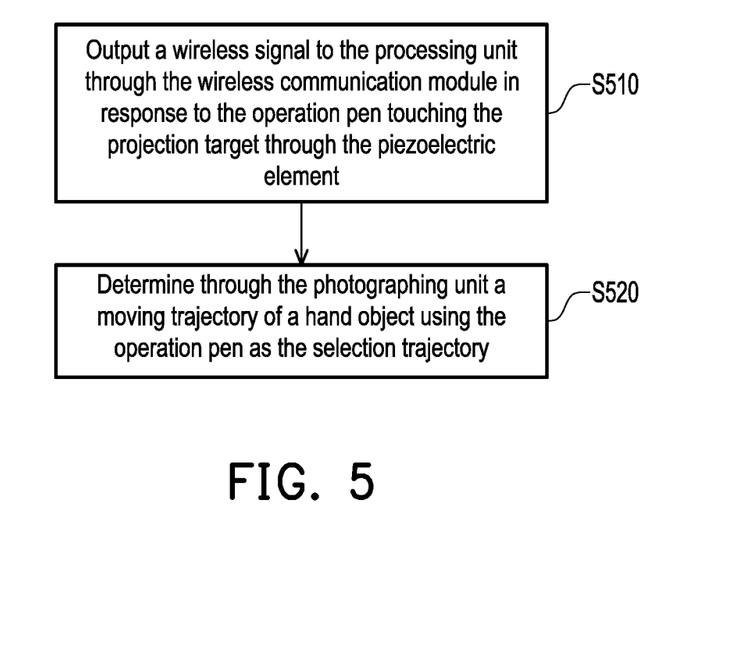
FIG. 5 is an operation flowchart of an operation pen according to an embodiment of the disclosure.

FIG. 5 is an operation flowchart of an operation pen according to an embodiment of the disclosure. Referring to FIG. 1, FIG. 3 and FIG. 5, in the embodiment, the operation pen 120 is a stylus pen. The operation pen 120 may include a piezoelectric element and a wireless communication module. The piezoelectric element may be arranged, for example, at a pen point of the operation pen 120. The wireless communication module may be electrically coupled to the piezoelectric element. The wireless communication module may be, for example, a Bluetooth communication module, a Zigbee communication module, an ANT communication module or other low-power short-distance transmission modules. The user may for example, hold the operation pen 120 and touch the pen point on the projection target 300 to perform a selection action or click the projection image 305 or the function menu patterns 306, 307. In other embodiments, the operation pen 120 may include an infrared light emitter, and the photographing unit 113 may further include an infrared sensor to detect the selection trajectory of the operation pen 120.

In the embodiment, the projection system 100 executes following steps S510 and S520 to determine the selection trajectory for capturing the writing image. In step S510, in response to the operation pen 120 touching the projection target 300 through the piezoelectric element of the operation pen 120, the wireless communication module may output a wireless signal to the processing unit 111. In step S520, the processing unit 111 may determine a moving trajectory of a hand object using the operation pen 120 as the selection trajectory through the photographing unit 113. In other words, in response to the user holding the operation pen 120 and touching the pen point on the projection target 300 to perform a selection action, since the piezoelectric element arranged on the pen point of the operation pen 120 generates a piezoelectric signal to the wireless communication module, the wireless communication module may notify the projection system 100 to indicate that the operation pen 120 is currently performing the selection action. In this way, the projection system 100 may use the photographing unit 113 to determine the moving trajectory of the hand object of the user holding the operation pen 120 as the selection trajectory.

In the embodiment, the processing unit 111 may for example, execute a preset artificial intelligence (AI) module or a neural network module to perform image recognition, and may automatically determine a hand of the user in the image, and performs positioning and movement tracking on the same to obtain the moving trajectory.

Figure 6:
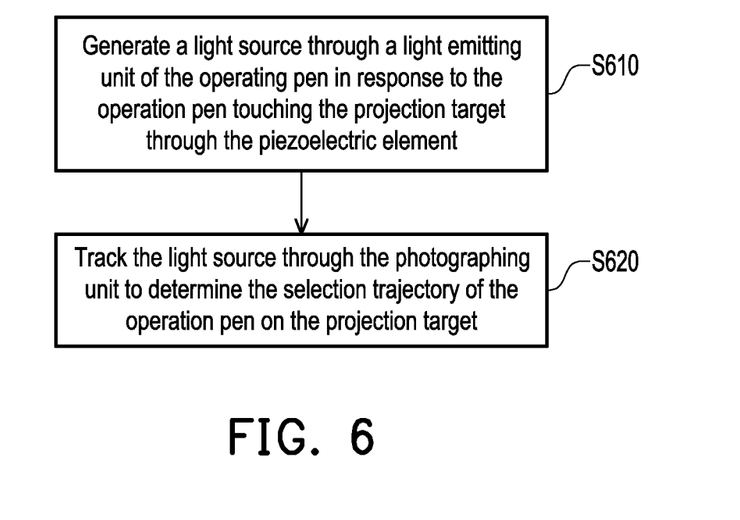
FIG. 6 is an operation flowchart of the operation pen according to another embodiment of the disclosure.

FIG. 6 is an operation flowchart of the operation pen according to another embodiment of the disclosure. Referring to FIG. 1, FIG. 3 and FIG. 6, in the embodiment, the operation pen 120 may include a piezoelectric element and a light emitting unit. The piezoelectric element may be, for example, arranged at the pen point of the operation pen 120. The light emitting unit may be electrically coupled to the piezoelectric element. The light emitting unit may for example, include a light emitting diode (LED). The user may for example, hold the operation pen 120, and touch the pen point on the projection target 300 to perform a selection action or click on the projection image 305 or the function menu patterns 306, 307.

In the embodiment, the projection system 100 executes following steps S610, S620 to determine the selection trajectory for capturing the writing image. In step S610, in response to the operation pen 120 touching the projection target 300 through the piezoelectric element, the light emitting unit of the operating pen 120 may generate a light source. In step S620, the processing unit 111 may use the photographing unit 113 to track the light source, so as to determine the selection trajectory of the operation pen 120 on the projection target 300. In other words, in response to the user holding the operation pen 120 and touching the pen point on the projection target 300 to perform a selection action, since the piezoelectric element arranged on the pen point of the operation pen 120 generates a piezoelectric signal to the light emitting unit, the light emitting unit emits light. In this way, the projection system 100 may use the photographing unit 113 to determine that the operation pen 120 is currently performing the selection action, and the projection system 100 may use the photographing unit 113 to track the light beam so as to take the moving trajectory of the light beam as the selection trajectory.

In the embodiment, the processing unit 111 may for example, execute a preset artificial intelligence module, a neural network module, or other image recognition modules, etc., to perform image recognition, so as to automatically determine a position of the light beam in the image, and perform positioning and movement tracking on the same to obtain the moving trajectory of the light source.

Figure 7:
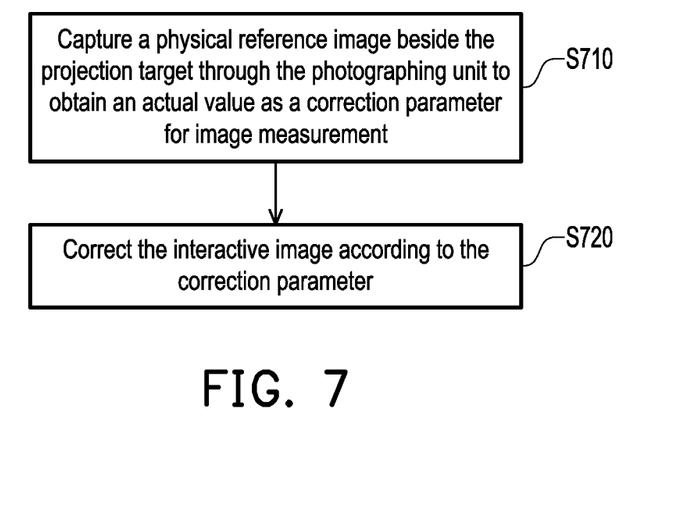
FIG. 7 is a flowchart of correcting an interactive image according to an embodiment of the disclosure.

FIG. 7 is a flowchart of correcting an interactive image according to an embodiment of the disclosure. Referring to FIG. 1, FIG. 3 and FIG. 7, the projection system 100 may execute following steps S710-S720 to correct the interactive image. In step S710, the processing unit 111 may use the photographing unit 113 to capture a physical reference image beside the projection target 300 to obtain an actual value as a correction parameter for image measurement. In step S720, the processing unit 111 may correct the interactive image 115 according to the correction parameter. In the embodiment, the physical reference image may be implemented, for example, in the form of a product logo disposed beside the projection target 300. The processing unit 111 may compare a size of the pre-stored physical reference image and/or other relevant parameters required for image correction with a size of the reference image obtained by the photographing unit 113 and/or other relevant parameters required for image correction, to calculate the corresponding correction parameter. In this regard, the processing unit 111 may for example, execute a preset gradient correction module, focal length correction module or related image correction module, etc., to perform gradient correction, focal length correction or related image correction according to the correction parameter, so as to implement a function of automatically optimizing the interactive image 115.

Figure 8:
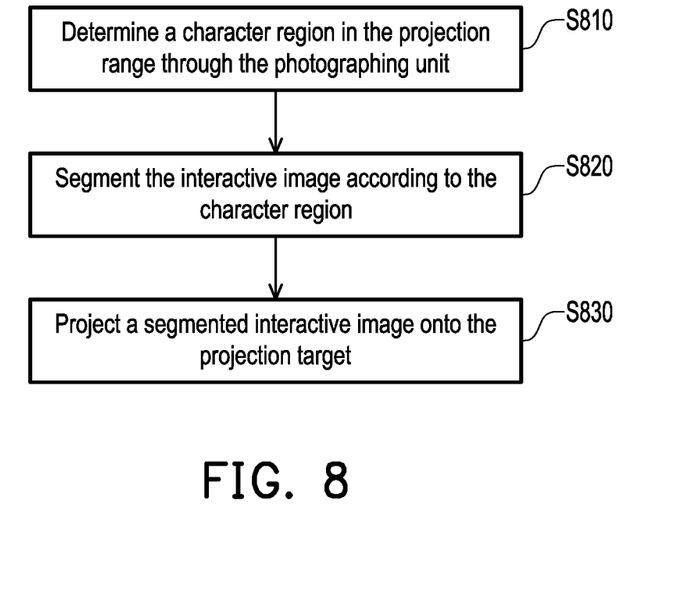
FIG. 8 is a flowchart of segmenting an interactive image according to an embodiment of the disclosure.
Figure 9:
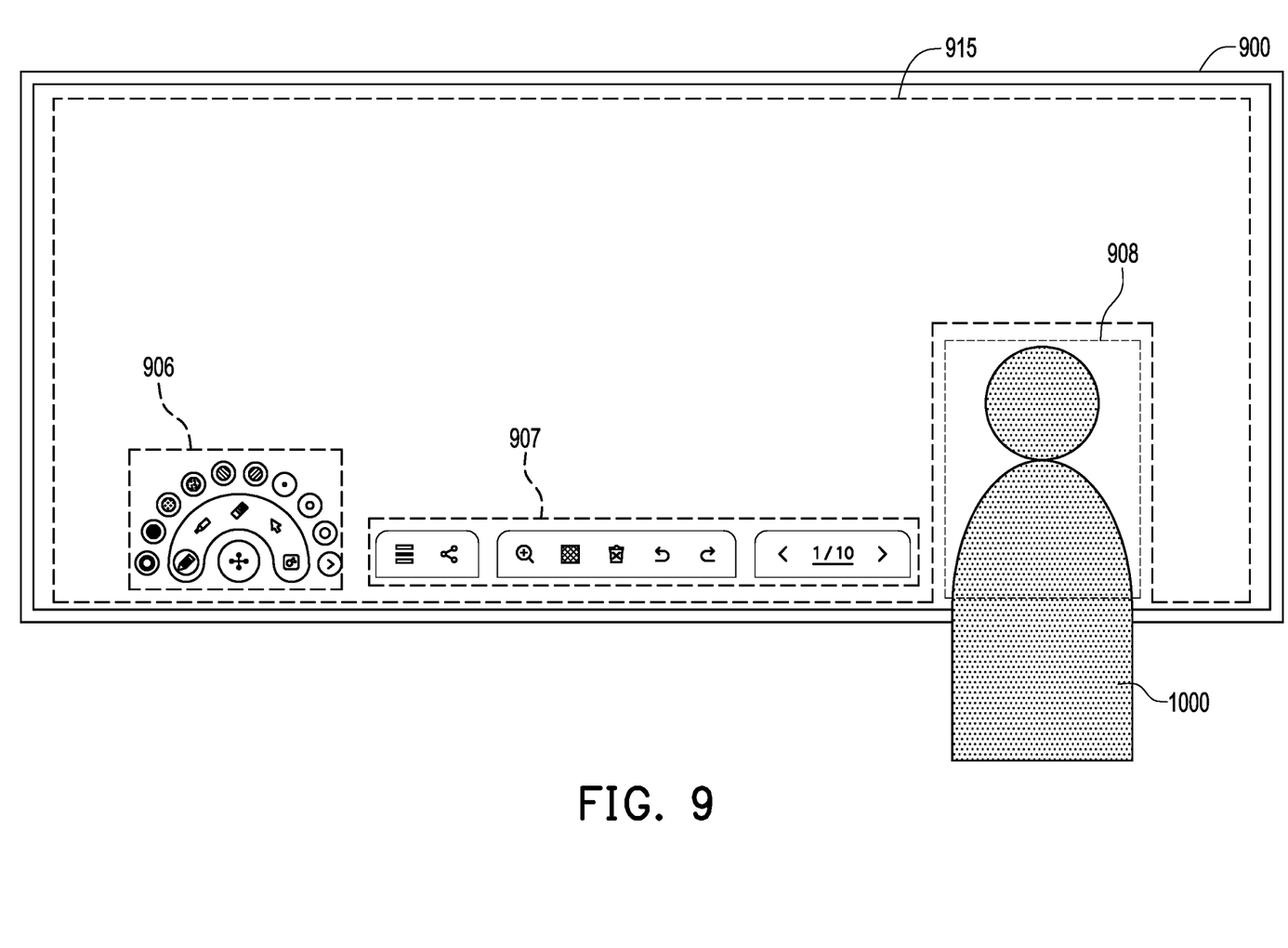
FIG. 9 is a schematic diagram of a situation of segmenting the interactive image according to an embodiment of the disclosure.

FIG. 8 is a flowchart of segmenting an interactive image according to an embodiment of the disclosure. FIG. 9 is a schematic diagram of a situation of segmenting the interactive image according to an embodiment of the disclosure. Referring to FIG. 8 and FIG. 9, the projection system 100 may execute following steps S810-S830 to segment the interactive image. In the embodiment, since a user 1000 (such as a lecturer or teacher) may be teaching a class, giving a speech, or writing in front of a projection target 900, the user 1000 may block a part of the interactive image, and the interactive image is projected on the user 1000 and partial image distortion is occurred, and the eyes of the user 1000 may be probably irradiated by projection light of the projection unit 112 and feel uncomfortable. Therefore, in step S810, the processing unit 111 may determine a character region 908 in the projection range through the photographing unit 113. In step S820, the processing unit 111 may segment the interactive image according to the character region 908. In step S830, the projection unit 112 may project a segmented interactive image 915 onto the projection target 900, where the segmented interactive image 915 and the character region 908 do not overlap on the projection target 900.

In the embodiment, the processing unit 111 may for example, execute a preset artificial intelligence module, a neural network module, or other image recognition modules to perform image recognition, so as to automatically determine a character image in the image, and perform range determination and movement tracking on the same to obtain a range of the dynamically changed character region 908. In this way, the processing unit 111 may then, for example, execute a preset image segmenting module to dynamically segment and remove the part of the interactive image corresponding to the character region 908, so as to project the segmented interactive image 915 onto the projection target 900, thereby effectively avoiding projecting images onto the user 1000. Moreover, the segmented interactive image 915 may also include the function menu patterns 906 and 907, and in response to a change of the character region 908, display positions of the function menu patterns 906 and 907 may also change accordingly, and are not limited to the positions shown in FIG. 9. In other words, even if the position of the user 1000 moves to change the character region 908, the segmented interactive image 915 projected by the projection unit 112 still keeps displaying the function menu patterns 906 and 907, so as to maintain providing the relevant menu functions.

In summary, the projection system, the interactive projection method and the projector of the disclosure may use the projector to project an interactive image on the projection target, and may use the photographing unit to photograph the projection target. The projection system and the projector of the disclosure may automatically capture the writing content in the image according to the selection trajectory of the operation pen, and automatically convert it into a writing image. The projection system and the projector of the disclosure may also project the writing image onto the projection target again, and may also perform image movement or image editing operations on the writing image through the operation pen, so as to realize diversified and real-time interactive projection functions.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection system, comprising:
   an operation pen; and a projector, wirelessly connected to the operation pen and comprising:
   at least one processing unit;
   a projection unit, electrically coupled to the at least one processing unit and configured to project an interactive image onto a projection target; and
   a photographing unit, electrically coupled to the at least one processing unit and configured to photograph at least one physical writing content circled by the operation pen on the projection target to obtain an image,
   wherein the interactive image projected by the projection unit comprises a writing image, and the writing image comprises the at least one physical writing content.

2. The projection system according to claim 1, wherein the at least one processing unit is configured to receive the image provided by the photographing unit and capture the writing image from the image.

3. The projection system according to claim 2, wherein the at least one processing unit is configured to perform a background removal process on the writing image.

4. The projection system according to claim 2, wherein the interactive image comprises a function menu pattern, and the operation pen touches the function menu pattern on the projection target through a piezoelectric element of the operation pen to perform function selection.

5. The projection system according to claim 4, wherein in response to the operation pen touching the function menu pattern to select an editing function or a moving function, the at least one processing unit is configured to edit or move the writing image according to an editing operation or a moving operation of the operation pen on the projection target.

6. The projection system according to claim 1, wherein the projector of the projection system is configured to project a duplicated image, the duplicated image has same image content as the writing image, and coordinates of the duplicated image do not overlap with coordinates of the writing image on the projection target.

7. The projection system according to claim 1, wherein the operation pen comprises:
   a piezoelectric element, disposed on a pen point of the operation pen; and
   a wireless communication module, electrically coupled to the piezoelectric element and outputting a wireless signal to the at least one processing unit in response to the piezoelectric element touching the projection target, so that the at least one processing unit is configured to determine a moving trajectory of a hand object using the operation pen as the selection trajectory.

8. The projection system according to claim 1, wherein the operation pen comprises:
   a piezoelectric element, disposed on a pen point of the operation pen; and
   a light emitting unit, electrically coupled to the piezoelectric element and generating a light beam in response to the piezoelectric element touching the projection target, so that the at least one processing unit is configured to track the light beam to determine the selection trajectory of the operation pen on the projection target.

9. The projection system according to claim 1, wherein a projection range of the projection unit is smaller than a photographing range of the photographing unit.

10. The projection system according to claim 1, wherein the at least one processing unit is configured to obtain an actual value as a correction parameter for image measurement according to capturing a physical reference image beside the projection target through the photographing unit, wherein the at least one processing unit is configured to correct the interactive image according to the correction parameter.

11. The projection system according to claim 1, wherein the at least one processing unit is configured to determine a character region in a projection range and segment the interactive image according to the character region, so that a segmented interactive image and the character region do not overlap on the projection target.

12. An interactive projection method, comprising:
   projecting an interactive image onto a projection target through a projection unit;
   photographing at least one physical writing content circled by an operation pen on the projection target through a photographing unit to obtain an image; and
   wherein the interactive image projected by the projection unit comprises a writing image, and the writing image comprises the at least one physical writing content.

13. The interactive projection method according to claim 12, further comprising:
   capturing the writing image from the image through at least one processing unit.

14. The interactive projection method according to claim 13, wherein the at least one processing unit is configured to perform a background removal process on the writing image before projecting the writing image.

15. The interactive projection method according to claim 13, wherein the interactive image comprises a function menu pattern, and the interactive projection method further comprises:
   touching the function menu pattern on the projection target through a piezoelectric element of the operation pen to perform function selection.

16. The interactive projection method according to claim 15, wherein performing function selection comprises:
   editing or moving the writing image by the at least one processing unit according to an editing operation or a moving operation of the operation pen on the projection target in response to the operation pen touching the function menu pattern to select an editing function or a moving function.

17. The interactive projection method according to claim 12, further comprising:
   projecting a duplicated image, wherein the duplicated image has same image content as the writing image, and coordinates of the duplicated image do not overlap with coordinates of the writing image on the projection target.

18. The interactive projection method according to claim 12, further comprising:
   outputting a wireless signal to the at least one processing unit through a wireless communication module in response to the operation pen touching the projection target through a piezoelectric element of the operation pen; and
   determining by the at least one processing unit through the photographing unit a moving trajectory of a hand object using the operation pen as the selection trajectory.

19. The interactive projection method according to claim 12, further comprising:
   generating a light beam through a light emitting unit of the operation pen in response to the operation pen touching the projection target through a piezoelectric element; and tracking the light beam by the at least one processing unit through the photographing unit to determine the selection trajectory of the operation pen on the projection target.

20. The interactive projection method according to claim 12, wherein a projection range of the projection unit is smaller than a photographing range of the photographing unit.

21. The interactive projection method according to claim 12, further comprising:
capturing a physical reference image beside the projection target by the at least one processing unit through the photographing unit to obtain an actual value as a correction parameter for image measurement; and
correcting the interactive image by the at least one processing unit according to the correction parameter.

22. The interactive projection method according to claim 12, wherein projecting the interactive image comprises:
determining a character region in a projection range by the at least one processing unit through the photographing unit and
segmenting the interactive image by the at least one processing unit according to the character region; and
projecting a segmented interactive image onto the projection target, wherein the segmented interactive image and the character region do not overlap on the projection target.

23. A projector, comprising:
at least one processing unit;
a projection unit, electrically coupled to the at least one processing unit and configured to project an interactive image onto a projection target; and
a photographing unit, electrically coupled to the at least one processing unit and configured to photograph at least one physical writing content circled by an operation pen on the projection target to obtain an image,
wherein the interactive image projected by the projection unit comprises a writing image, and the writing image comprises the at least one physical writing content.

* * * * *